(12) United States Patent
Yamane et al.

(10) Patent No.: US 11,904,868 B2
(45) Date of Patent: Feb. 20, 2024

(54) INFORMATION PROCESSING DEVICE, RECORDING MEDIUM, AND INFORMATION PROCESSING METHOD

(71) Applicant: TOYOTA JIDOSHA KABUSHIKI KAISHA, Toyota (JP)

(72) Inventors: Josuke Yamane, Nisshin (JP); Naoya Oka, Nagakute (JP); Ryosuke Yamamoto, Nagoya (JP); Kaori Okuda, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/197,657

(22) Filed: Mar. 10, 2021

(65) Prior Publication Data
US 2021/0291841 A1     Sep. 23, 2021

(30) Foreign Application Priority Data

Mar. 17, 2020 (JP) ................. 2020-046182

(51) Int. Cl.
*B60W 40/09* (2012.01)
*B60W 50/14* (2020.01)
*B60W 40/02* (2006.01)

(52) U.S. Cl.
CPC ............ *B60W 40/09* (2013.01); *B60W 40/02* (2013.01); *B60W 50/14* (2013.01); *B60W 2050/146* (2013.01); *B60W 2540/22* (2013.01)

(58) Field of Classification Search
CPC ...... B60W 40/09; B60W 40/02; B60W 50/14; B60W 2050/146; B60W 2540/22
See application file for complete search history.

(56) References Cited

U.S. PATENT DOCUMENTS

| | | | |
|---|---|---|---|
| 10,387,963 B1* | 8/2019 | Leise | H04M 3/527 |
| 2003/0060937 A1* | 3/2003 | Shinada | G01C 21/3641 |
| | | | 701/1 |
| 2008/0269958 A1 | 10/2008 | Filev et al. | |
| 2011/0043635 A1 | 2/2011 | Fujita et al. | |
| 2011/0144856 A1* | 6/2011 | Christie | B60K 37/06 |
| | | | 345/173 |

(Continued)

FOREIGN PATENT DOCUMENTS

| | | |
|---|---|---|
| CN | 101669090 A | 3/2010 |
| JP | 2003-72488 A | 3/2003 |

(Continued)

OTHER PUBLICATIONS

Lee et al., English translation of KR20190034825A, 2019, Espacenet (Year: 2019).*

*Primary Examiner* — Fadey S. Jabr
*Assistant Examiner* — Naeem Taslim Alam
(74) *Attorney, Agent, or Firm* — Sughrue Mion, PLLC

(57) ABSTRACT

An information processing device includes a controller that is configured to: acquire driving behavior information as an indication of prudence of a driver in driving a vehicle, acquire a vehicle avatar corresponding to the vehicle, the vehicle avatar having a basic personality set thereto according to information about the vehicle, create a message according to the basic personality of the vehicle avatar based on the driving behavior information, and output the message, that is created, as an utterance of the vehicle avatar.

14 Claims, 10 Drawing Sheets

(56) References Cited

U.S. PATENT DOCUMENTS

| | | | | |
|---|---|---|---|---|
| 2011/0231434 A1* | 9/2011 | Tabata | ................... | G06N 3/006 |
| | | | | 707/769 |
| 2013/0013157 A1* | 1/2013 | Kim | ...................... | B60R 16/037 |
| | | | | 701/49 |
| 2014/0113619 A1* | 4/2014 | Tibbitts | ................ | H04W 48/04 |
| | | | | 455/419 |
| 2014/0313208 A1* | 10/2014 | Filev | ...................... | A61B 5/744 |
| | | | | 345/474 |
| 2017/0102783 A1* | 4/2017 | Shikii | ................... | G06F 3/0304 |
| 2017/0291615 A1* | 10/2017 | Kusano | ................ | B60W 30/12 |
| 2018/0009442 A1* | 1/2018 | Spasojevic | ......... | G01C 21/3617 |
| 2018/0060020 A1* | 3/2018 | Dogrultan | ............... | G06F 3/165 |
| 2019/0051413 A1* | 2/2019 | Son | ........................ | G06N 3/008 |
| 2020/0223352 A1* | 7/2020 | Toshio Kimura | .... | B60Q 1/5037 |
| 2020/0317215 A1* | 10/2020 | Honda | ................. | B60W 50/10 |

FOREIGN PATENT DOCUMENTS

| | | | | |
|---|---|---|---|---|
| JP | 2014-151030 A | 8/2014 | | |
| JP | 2017-150957 A | 8/2017 | | |
| KR | 2019034825 A | * 4/2019 | .............. | B60Q 1/34 |
| WO | 2009/107210 A1 | 9/2009 | | |

\* cited by examiner

FIG. 4

| VEHICLE TYPE | VEHICLE COLOR | AVATAR ID | MODEL ID |
|---|---|---|---|
| CT01 | WHITE | AV01 | MD01 |
| CT01 | BLACK | AV02 | MD02 |
| CT01 | RED | AV03 | MD03 |
| CT01 | BLUE | AV04 | MD04 |
| CT02 | WHITE | AV05 | MD05 |
| CT02 | BLACK | AV06 | MD06 |
| CT02 | YELLOW | AV07 | MD07 |

CASE OF PRUDENT DRIVING

CASE OF NON-PRUDENT DRIVING

ACCOUNT NAME OF VEHICLE AVATAR

CASE OF PRUDENT DRIVING AND TRAFFIC JAM

INFORMATION PROCESSING DEVICE, RECORDING MEDIUM, AND INFORMATION PROCESSING METHOD

CROSS REFERENCE TO RELATED APPLICATION

This application claims the benefit of Japanese Patent Application No. 2020-046182, filed on Mar. 17, 2020, which is hereby incorporated by reference herein in its entirety.

BACKGROUND

Technical Field

The present disclosure relates to an information processing device, a recording medium, and an information processing method.

Description of the Related Art

There is disclosed a technology for expressing a user's handling of a vehicle based on a virtual feeling by assuming that the vehicle has a personality, and for displaying the virtual feeling by a facial expression of a predetermined character (for example, Patent document 1).

CITATION LIST

Patent Document

[Patent document 1] Japanese Patent Laid-Open No. 2003-72488

A subject of one aspect of the disclosure is to provide an information processing device, a recording medium, and an information processing method that are capable of promoting safe driving.

SUMMARY

One aspect of the present disclosure is an information processing device comprising a controller configured to:
  acquire driving behavior information as an indication of prudence of a driver in driving a vehicle,
  acquire a vehicle avatar corresponding to the vehicle, the vehicle avatar having a basic personality set thereto according to information about the vehicle,
  create a message according to the basic personality of the vehicle avatar based on the driving behavior information, and
  output the message as an utterance of the vehicle avatar.

Another aspect of the present disclosure is a non-transitory computer-readable recording medium recorded with a program for causing a computer to:
  acquire driving behavior information as an indication of prudence of a driver in driving a vehicle,
  acquire a vehicle avatar corresponding to the vehicle, the vehicle avatar having a basic personality set thereto according to information about the vehicle,
  create a message according to the basic personality of the vehicle avatar based on the driving behavior information, and
  output the message as an utterance of the vehicle avatar.

Another aspect of the present disclosure is an information processing method executed by a computer comprising:
  acquiring driving behavior information as an indication of prudence of a driver in driving a vehicle,
  acquiring a vehicle avatar corresponding to the vehicle, the vehicle avatar having a basic personality set thereto according to information about the vehicle,
  creating a message according to the basic personality of the vehicle avatar based on the driving behavior information, and
  outputting the message as an utterance of the vehicle avatar.

According to the present disclosure, safe driving may be promoted.

BRIEF DESCRIPTION OF DRAWINGS

FIG. 4 is an example of the avatar setting table;

DESCRIPTION OF THE EMBODIMENTS

Figure 1:
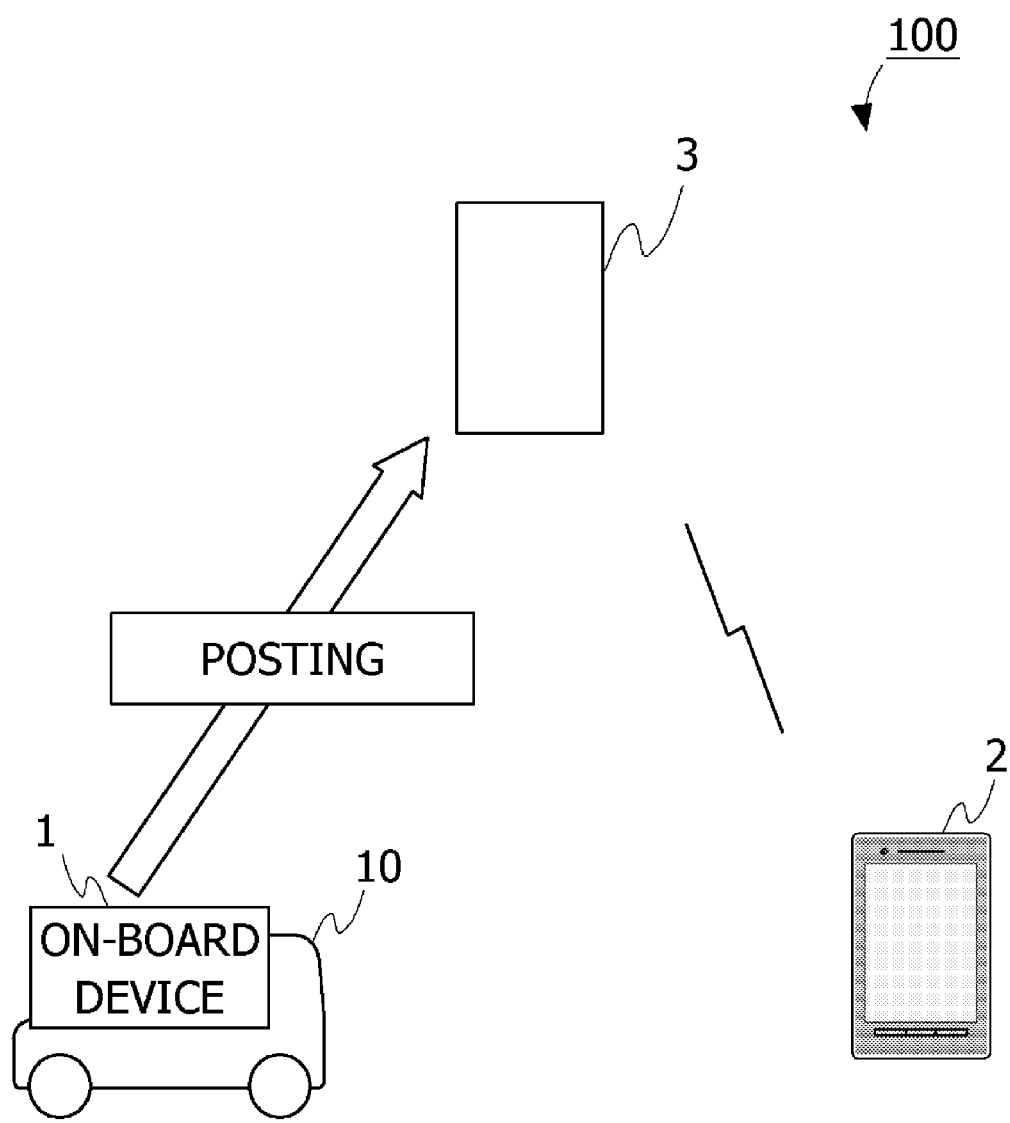
FIG. 1 is a diagram illustrating an example of a system configuration of a vehicle avatar system according to a first embodiment.

People tend to lose objectivity while driving a vehicle. For example, there may be people who drive aggressively unlike their normal selves. The present disclosure is to present a driver with an opportunity to reflect back on his/her driving by making the driver view himself/herself from an objective perspective.

An aspect of the present disclosure is an information processing device including a controller that is configured to acquire driving behavior information as an indication of prudence in driving a vehicle, create a message according to a basic personality of a vehicle avatar based on the driving behavior information, and output the message as an utterance of the vehicle avatar. The vehicle avatar corresponds to a vehicle, and may be a virtual human that is an anthropomorphized vehicle. A basic personality according to information about the vehicle is set for the vehicle avatar.

For example, in the case where the driving behavior information indicates that driving is prudent, the controller may create a message indicating that the vehicle avatar has a positive feeling. Furthermore, in a case where the driving behavior information indicates that driving is not prudent enough, the controller may create a message indicating that the vehicle avatar has a negative feeling. A positive feeling is a feeling such as happy, cheerful, gentle, amused or the like, for example. A negative feeling is a feeling such as angry, sad or the like, for example.

Furthermore, the controller may acquire the message that is an output that is obtained by inputting the driving behavior information to a learned model that is associated with the vehicle avatar for which the basic personality according to the information about the vehicle is set.

For example, the driving behavior information may include at least one of number of times of sudden braking, number of times of sudden steering, number of times of sudden starting, and number of times a horn is sounded. However, information that is taken as the driving behavior information is not limited to the above.

According to an aspect of the present disclosure, because the utterance of the vehicle avatar is dependent on the driving behavior information, a driver of the vehicle may reflect back on his/her driving from an objective perspective by checking content of the utterance of the vehicle avatar, and safe driving may thereby be promoted.

According to an aspect of the present disclosure, the controller may have account information of the vehicle avatar for a predetermined social network service (SNS), and may post the message on the SNS using the account of the vehicle avatar. The account information includes information such as an account name and a login password, for example. Making the message of the vehicle avatar public will make the driver of the vehicle more conscious of other people and the driver will try to drive more safely.

Furthermore, according to an aspect of the present disclosure, the controller may acquire information about an environment of surroundings on a road where the vehicle traveled, and may create the message based on the driving behavior information and the information about the environment. For example, the feeling of a driver is possibly affected by a surrounding environment. For example, when there is a traffic jam or a road repairing work, a driver may become irritated due to not being able to travel smoothly, and such a feeling may be reflected in the driving, resulting in aggressive driving. However, driving in such a case is not assumed to be caused by true nature of the driver.

Accordingly, in a case where the driving behavior information indicates that driving lacks prudence and the information about the environment indicates that a surrounding environment negatively affects a feeling of the driver, the controller may create a message indicating that the vehicle avatar has a more positive feeling than in a case where the driving behavior information indicates lack of prudence in driving and the information about the environment indicates that the surrounding environment does not negatively affect the feeling of the driver. This may prevent the negative effect of the surrounding environment on the feeling of the driver from being reflected in the message of the vehicle avatar.

Alternatively, the controller may acquire information about an environment of surroundings on a road where the vehicle traveled, and may create a background of a display screen for the message based on the information about the environment and output information about the background of the display screen together with the message. For example, in the case where the driver drives prudently even when there is a traffic jam, the display screen for the message may include a message of the vehicle avatar with happy content, albeit with a background image with a dark impression. When looking at the message, the driver may reflect back that he/she took care to drive prudently without being affected by the surrounding environment.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example of a system configuration of a vehicle avatar system 100 according to a first embodiment. The vehicle avatar system 100 is a system where an avatar corresponding to a vehicle posts, on an SNS, a message according to the level of prudence of a driver in driving the vehicle. The vehicle avatar system 100 includes an on-board device 1 mounted on a vehicle 10, a user terminal 2, and an SNS server 3. For example, the on-board device 1 is capable of communicating with the SNS server 3 through the Internet. For example, the SNS server 3 is capable of communicating with the user terminal 2 through the Internet. The user terminal 2 is a terminal owned by a driver of the vehicle 10. The on-board device 1 is capable of connecting to a mobile network or a WiFi network by wireless communication, for example, and is capable of connecting to the Internet through such an access network.

For example, when registration to use a vehicle avatar service provided by the vehicle avatar system 100 is input by a user operation, the on-board device 1 creates a vehicle avatar that is obtained by anthropomorphizing the vehicle 10, and registers an account for the vehicle avatar in the SNS server 3. The vehicle avatar is created as an avatar that is not related to the vehicle 10 and the driver of the vehicle 10.

The on-board device 1 collects driving behavior information of the vehicle 10. The driving behavior information is history information of predetermined events occurring during driving of the vehicle 10 by the driver, and is information that is used as an indication of prudence in driving. The predetermined events include detection of sudden braking, sudden steering, sudden starting, sounding of a horn, meandering driving and the like, for example. Furthermore, the predetermined events may include an event that is obtained from a recognition result regarding a captured image from a camera, such an event as being giving way to a pedestrian or merging support of letting another vehicle enter a lane. Additionally, the predetermined events are not limited to those mentioned above.

The on-board device 1 creates, at a predetermined timing, a message of the vehicle avatar based on the driving behavior information for a predetermined period of time, transmits the message to the SNS server 3, and performs posting as the vehicle avatar. The timing of creating and posting the message on the SNS is a predetermined time once per day or a timing of end of traveling, for example. End of traveling of the vehicle 10 may be detected based on lapse of a predetermined period of time from when an engine is stopped, for example.

For example, in the case where the driving behavior information indicates that driving of the driver of the vehicle 10 is prudent, a message indicating that the vehicle avatar has a positive feeling, such as "it was a good day today", is created as the message of the vehicle avatar. For example, in the case where the driving behavior information indicates that driving of the driver of the vehicle 10 is not prudent, a message indicating that the vehicle avatar has a negative feeling, such as "nothing good happened today", is created as the message of the vehicle avatar.

For example, when the driver of the vehicle 10 views a page of the account of the vehicle avatar on the SNS through the user terminal 2, the driver of the vehicle 10 will view the post message of the vehicle avatar of the vehicle 10. The driver may thus reflect back on the level of prudence in his/her driving from nuance, mood or the like of the post message of the vehicle avatar.

Figure 2:
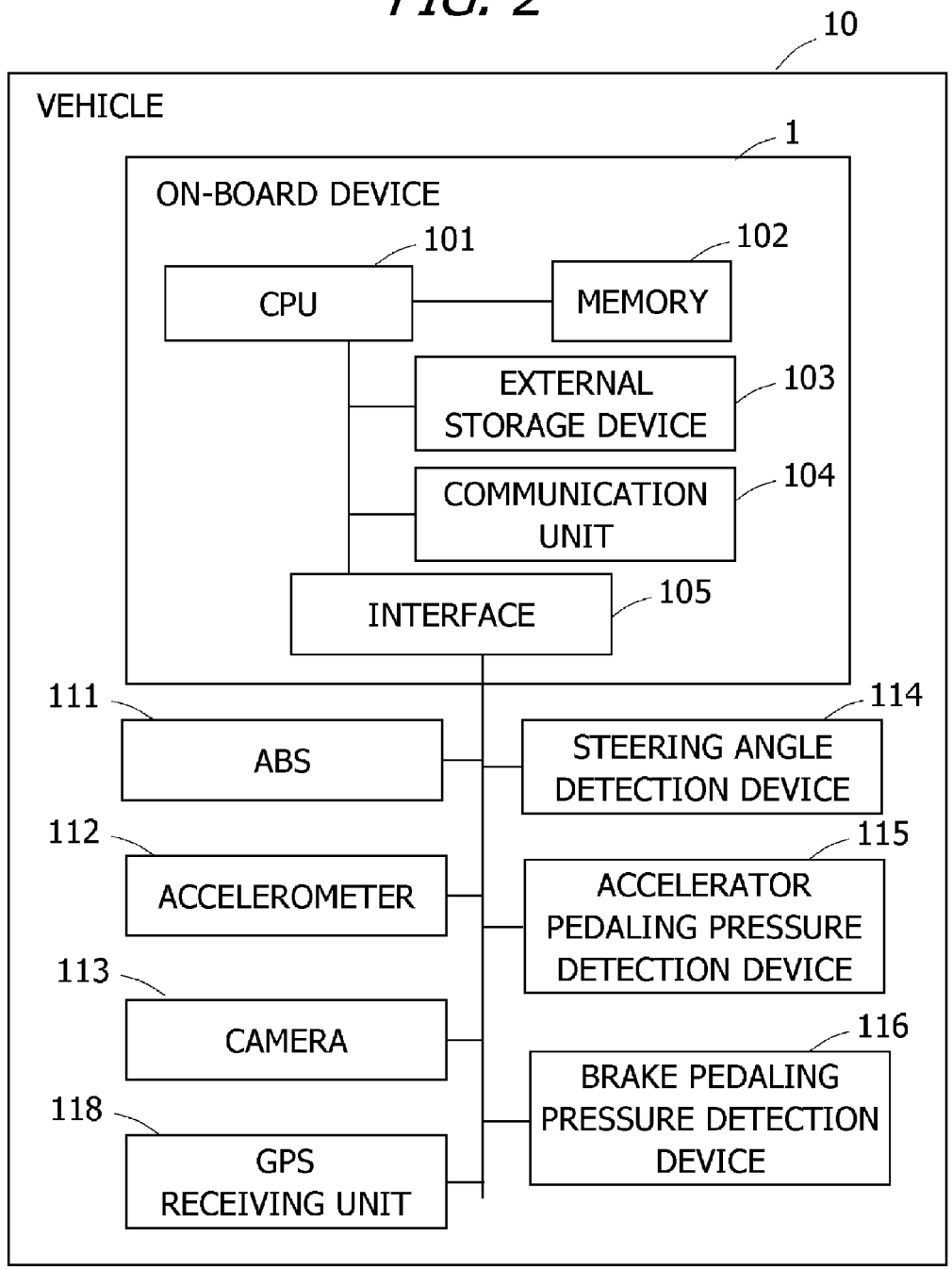
FIG. 2 is a diagram illustrating an example of a hardware configuration of the vehicle.

FIG. 2 is a diagram illustrating an example of a hardware configuration of the vehicle 10. Additionally, FIG. 2 extracts and illustrates hardware configuration related to processes by the vehicle avatar system 100, among the hardware configuration of the vehicle 10. As the hardware configuration related to processes by the vehicle avatar system 100, the vehicle 10 includes the on-board device 1, an anti-lock braking system (ABS) 111, an accelerometer 112, a camera 113, a steering angle detection device 114, an accelerator pedaling pressure detection device 115, a brake pedaling pressure detection device 116, and a GPS receiving unit 118.

The ABS 111 is a system for preventing tires from becoming locked at a time of sudden braking, for example. Stability of a traveling direction of the vehicle at the time of sudden braking may be maintained by the ABS 111, and the possibility of avoiding an obstacle by a steering operation may be increased. In the first embodiment, the ABS 111 may be used to detect sudden braking, for example.

The accelerometer 112 measures acceleration that is applied to the vehicle 10. A detection value of the accelerometer 112 may be used to detect sudden braking and sudden starting, for example. The camera 113 is installed facing outside the vehicle 10, and captures an image of a front side outside the vehicle 10, for example. An image from the camera 113 may be used to detect that a way is given to a pedestrian or to detect merging support for another vehicle, for example.

The steering angle detection device 114 detects a steering angle that is the angle of a steering wheel that is turned by the driver. For example, the steering angle may be used to detect sudden steering. The accelerator pedaling pressure detection device 115 detects the pedaling pressure on an accelerator pedal by the driver. For example, the pedaling pressure on the accelerator pedal may be used to detect sudden starting. The brake pedaling pressure detection device 116 detects the pedaling pressure on a brake pedal by the driver. For example, the pedaling pressure on the brake pedal may be used to detect sudden braking. Additionally, instead of the accelerator pedaling pressure detection device 115, an accelerator pedaling amount detection device that detects the pedaling amount of the accelerator pedal may be used, and the pedaling amount of the accelerator pedal may be used to detect sudden starting. Instead of the brake pedaling pressure detection device 116, a brake pedaling amount detection device that detects the pedaling amount of the brake pedal may be used, and the pedaling amount of the brake pedal may be used to detect sudden braking.

The GPS (global positioning system) receiving unit 118 receives radio waves carrying time signals from a plurality of global positioning satellites orbiting the Earth, and calculates latitude and longitude from the detected signal as position information, for example.

Next, as hardware configuration, the on-board device 1 includes a central processing unit (CPU) 101, a memory 102, an external storage device 103, and a communication unit 104. The memory 102 and the external storage device 103 are each a computer-readable recording medium. The on-board device 1 is an example of "information processing device".

The external storage device 103 stores various programs, and data that is used by the CPU 101 at the time of execution of each program. For example, the external storage device 103 is an erasable programmable ROM (EPROM) or a hard disk drive. Programs held in the external storage device 103 include the operating system (OS), a vehicle avatar control program, and various other application programs, for example. The vehicle avatar control program is a program for controlling the vehicle avatar of the vehicle 10.

The memory 102 is a main memory that provides, to the CPU 101, a storage area and a work area for loading programs stored in the external storage device 103, and that is used as a buffer. The memory 102 includes semiconductor memories such as a read only memory (ROM) and a random access memory (RAM), for example.

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of "controller" of "information processing device".

The communication unit 104 is an interface through which information is input to/output from a network. The communication unit 104 is an interface that connects to a wireless network. For example, the communication unit 104 performs 5th generation (5G), long term evolution (LTE) or 3rd generation (3G) mobile communication, or communication according to a wireless communication standard such as WiFi.

The interface 105 connects hardware components in the vehicle 10, other than the on-board device 1, and the on-board device 1. The ABS 111, the accelerometer 112, the camera 113, the steering angle detection device 114, the accelerator pedaling pressure detection device 115, the brake pedaling pressure detection device 116, the GPS receiving unit 118 and the like are connected to the interface 105. The hardware configuration of the vehicle 10 is not limited to the one illustrated in FIG. 2.

Figure 3:
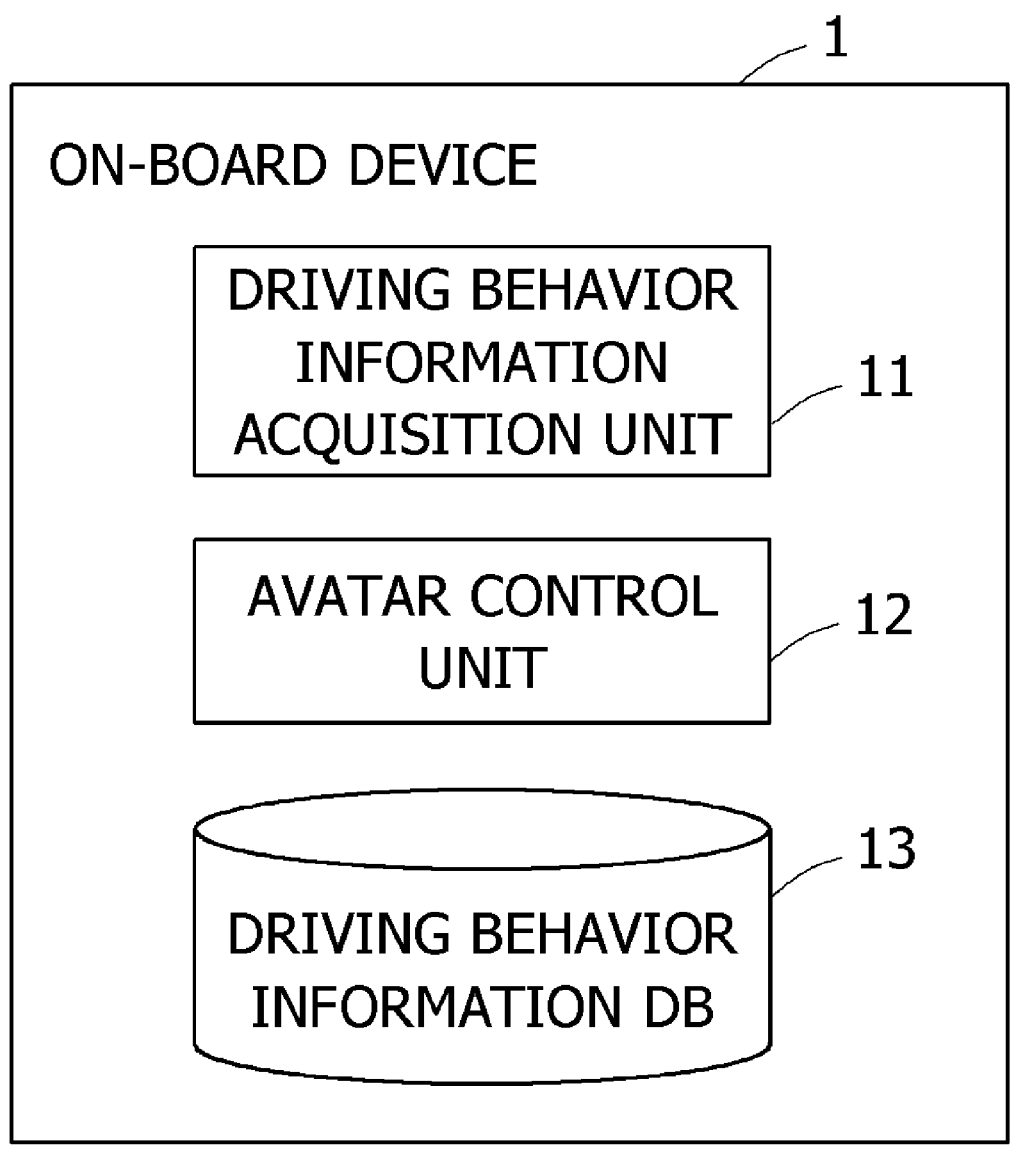
FIG. 3 is a diagram illustrating an example of a functional configuration of the on-board device.

FIG. 3 is a diagram illustrating an example of a functional configuration of the on-board device 1. As functional components, the on-board device 1 includes a driving behavior information acquisition unit 11, an avatar control unit 12, and a driving behavior information database (DB) 13. These functional components are functional components that are implemented by the CPU 101 of the on-board device 1 executing the vehicle avatar control program, for example.

The driving behavior information acquisition unit 11 generates the driving behavior information. Specifically, the driving behavior information acquisition unit 11 generates the driving behavior information in response to detection of occurrence of a predetermined event. The predetermined event is sudden braking, sudden starting, sudden steering, sounding of a horn, giving way to a pedestrian or merging support for another vehicle, for example.

The driving behavior information acquisition unit 11 acquires through the interface 105, every predetermined period of time, a detection value detected by each of the accelerometer 112, the camera 113, the steering angle detection device 114, the accelerator pedaling pressure detection device 115, and the brake pedaling pressure detection device 116 provided in the vehicle 10. The driving behavior information acquisition unit 11 detects occurrence of predetermined events from such detection values.

Sudden braking may be detected when an amount of change in the pedaling pressure on the brake pedal is equal to or greater than a predetermined threshold, when a value of the accelerometer 112 in an opposite direction from a traveling direction of the vehicle 10 is equal to or greater than a threshold, and/or based on detection by the ABS 111, for example. Sudden steering may be detected when an amount of change in the steering angle is equal to or greater than a predetermined threshold and/or when a value of the accelerometer 112 in a predetermined direction is equal to or greater than a threshold, for example. Sudden starting may be detected when an amount of change in the pedaling pressure on the accelerator pedal is equal to or greater than a predetermined threshold and/or when a value of the accelerometer 112 in the traveling direction of the vehicle 10 is equal to or greater than a threshold, for example. Sounding of the horn may be detected based on input of a horn pressing signal, for example. Giving way to a pedestrian or merging support for another vehicle is detected by monitoring a recognition result of a captured image from the camera 113, for example.

When occurrence of a predetermined event as described above is detected, the driving behavior information acquisition unit 11 generates the driving behavior information. The driving behavior information includes identification information of a user, identification information of the vehicle 10, the type of an event, and an occurrence time of the event, for example. Additionally, the type of an event may be sudden braking, sudden starting, sudden steering, sounding of the horn, giving way to a pedestrian, or merging support for another vehicle, for example.

Additionally, at the time of generating the driving behavior information, the driving behavior information acquisition unit 11 may check traffic jam information, and may include in the driving behavior information, in a case where there is a traffic jam in a section of the road that is currently being traveled, a road status indicating that there is a traffic jam. That is, the driving behavior information includes identification information of a user, identification information of the vehicle 10, the type of an event, an occurrence time of the event, and a road status, for example. Additionally, the traffic jam information may be acquired from Vehicle Information and Communication System (VICS; registered trademark) through a car navigation system provided in the vehicle 10, for example.

The avatar control unit 12 performs control related to the vehicle avatar. First, when use of the service related to the vehicle avatar is registered by a user operation, the avatar control unit 12 creates an avatar corresponding to the vehicle 10. Operation by a user for registration of use of the service related to the vehicle avatar is input from an input device, such as a touch panel, provided on the on-board device 1, or an input device, such as a touch panel, of the car navigation system that is mounted on the vehicle 10 and that connects to the on-board device 1, or is input from the user terminal 2 by predetermined wireless communication, for example.

The avatar control unit 12 creates the avatar based on information about the vehicle 10, for example. Specifically, the avatar control unit 12 includes an avatar setting table, and acquires an avatar, in the avatar setting table, corresponding to the information about the vehicle 10, as the avatar of the vehicle 10.

FIG. 4 is an example of the avatar setting table. The avatar setting table is stored in a storage area of the external storage device 103 of the on-board device 1. For example, information about a vehicle is included in association with an avatar and a learned model in the avatar setting table. Information about a vehicle is a vehicle type and a vehicle color of the vehicle 10, for example. However, information about a vehicle is not limited to such examples.

The avatar setting table illustrated in FIG. 4 includes fields of "vehicle type", "vehicle color", "avatar ID", and "model ID". Information indicating a vehicle type of a vehicle is stored in the field of "vehicle type". Information indicating a vehicle color of a vehicle is stored in the field of "vehicle color". Identification information of an avatar is stored in the field of "avatar ID". Identification information of a learned model is stored in the field of "model ID".

For example, the avatar control unit 12 identifies an entry in the avatar setting table matching the vehicle type and the vehicle color of the vehicle 10, and acquires the identification information of the avatar and the learned model from the fields of "avatar ID" and "model ID" of the entry. For example, the avatar control unit 12 transmits, to a predetermined server, the acquired identification information of the avatar and the learned model, and acquires information about the corresponding avatar and data of the corresponding learned model, for example. Information about an avatar is information about setting of the avatar, such as sex, age, basic personality and the like of the avatar. Information about an avatar may include appearance data of the avatar.

Information about each avatar and data of learned models may be stored in the external storage device 103 of the on-board device 1, and those corresponding to the vehicle 10 may be selected therefrom.

Referring back to FIG. 3, when a vehicle avatar is acquired, the avatar control unit 12 accesses the SNS server 3, and registers the account of the vehicle avatar in the SNS. The account name, the login password and the like are automatically created by the avatar control unit 12. Even when the driver of the vehicle 10 has an account for the SNS, the account of the vehicle avatar of the vehicle 10 and the account of the driver are not associated with each other in the form of friend or through following or follower registration, for example. The avatar control unit 12 stores the account information of the vehicle avatar including the account name, the login password and the like in a predetermined storage area of the external storage device 103, for example.

Next, the avatar control unit 12 creates a message of the vehicle avatar at a predetermined timing, based on the driving behavior information, and transmits the message to the SNS server and performs posting as the vehicle avatar. The timing of creating and posting the message of the vehicle avatar on the SNS is a predetermined time once per day or a timing when end of traveling is detected, for example.

The avatar control unit 12 creates the message of the vehicle avatar using a learned model that is acquired, for example. The learned model is a machine learning model that is obtained by learning the driving behavior information and the message as teacher data, the driving behavior information being given as input, the message being given as output, for example. The message of the teacher data is according to the setting of each avatar. That is, the message of the teacher data is a message that uses an expression, an ending of a sentence or a tone according to the sex, age and basic personality of the vehicle avatar. In the first embodiment, the learned model is prepared for information about each vehicle 10. For example, even when the driving behavior information of same content is input, the learned models output messages of nuances, tones, expressions or endings of sentences according to the settings of corresponding avatars, without outputting an exactly same message.

The avatar control unit 12 inputs the driving behavior information for a predetermined period of time to the learned model corresponding to the vehicle avatar, and acquires a message as the output. The target period of time is one day including a current time point, or a period of time from start of current traveling to end of the traveling, for example. Next, the avatar control unit 12 logs in to the SNS using the account information of the vehicle avatar, and posts the created message.

The driving behavior information DB 13 is created in a predetermined storage area in the external storage device 103, for example. The driving behavior information described above, or in other words, the history information of predetermined events, is stored in the driving behavior information DB 13. The driving behavior information stored in the driving behavior information DB 13 may be deleted at a predetermined timing. The timing of deletion of the driving behavior information is, but not limited to, a timing when a predetermined period of time elapses after registration.

<Flow of Processes>

Figure 5:
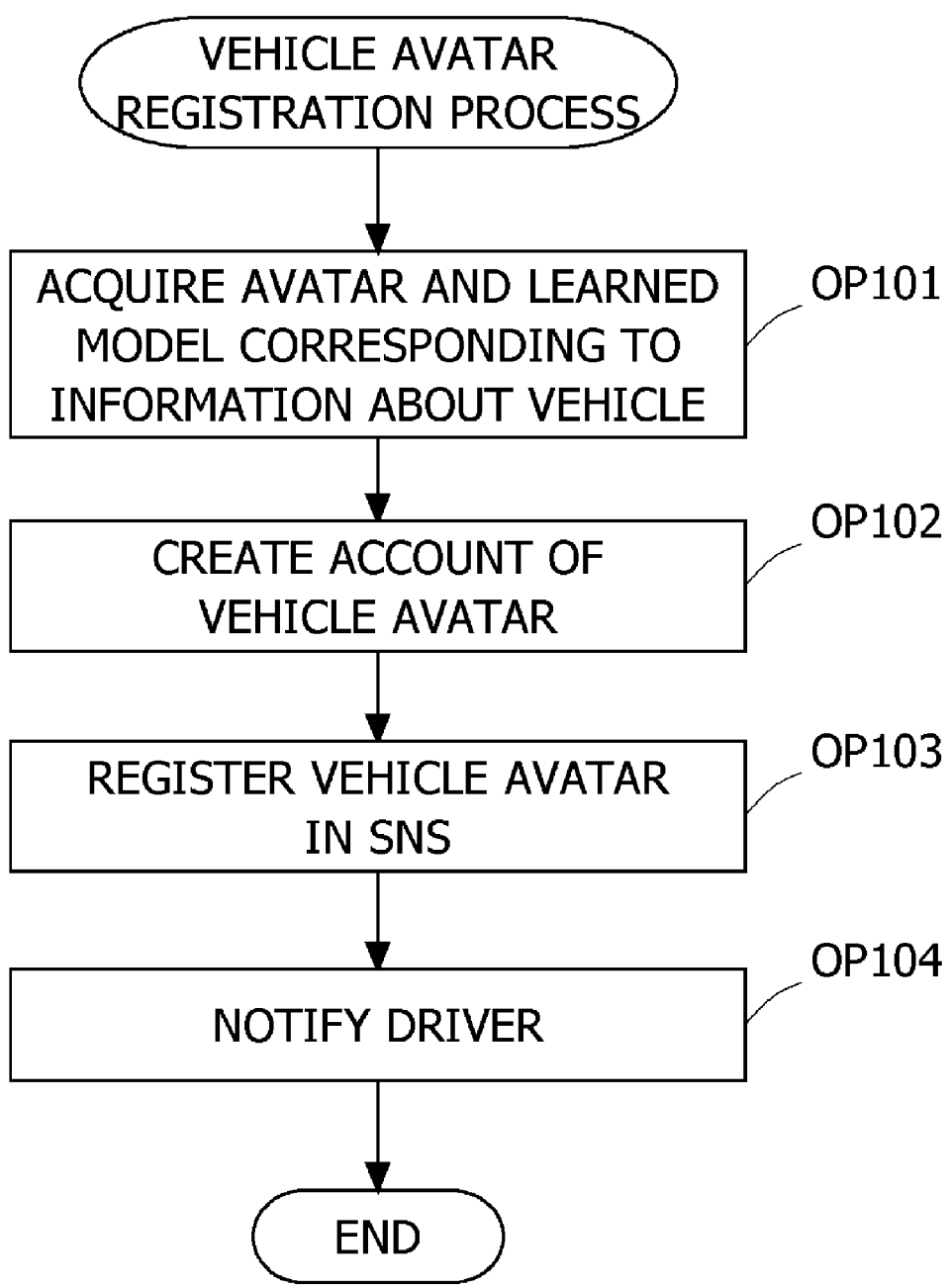
FIG. 5 is an example of a flowchart of a vehicle avatar registration process by the on-board device.

FIG. 5 is an example of a flowchart of a vehicle avatar registration process by the on-board device 1. The process illustrated in FIG. 5 is started when registration for use of the service related to the vehicle avatar is input by a user operation, for example. The performer of the process illustrated in FIG. 5 is the CPU 101 of the on-board device 1, but a description will be given taking functional components as the performer for the sake of convenience. The same is true for the following flowcharts.

In OP101, the avatar control unit 12 acquires the avatar and the learned model corresponding to information about the vehicle 10. Information about the vehicle 10 may be set in advance in a predetermined storage area in the external storage device 103 of the on-board device 1, or may be acquired through inquiry to another computer mounted on the vehicle 10, for example. In OP101, the avatar control unit 12 acquires the identification information of the avatar and the learned model corresponding to the information about the vehicle 10 from the avatar setting table (FIG. 4), and acquires information about the avatar and the learned model by issuing an inquiry to a predetermined server, for example.

In OP102, the avatar control unit 12 creates an account name of the vehicle avatar. In OP103, the avatar control unit 12 accesses the SNS server 3, and registers the account of the vehicle avatar. To register an account is to provide information requested by the SNS and to register the vehicle avatar in the SNS as one person, for example. For example, in a case where input of information such as age and sex is requested, the avatar control unit 12 provides the requested information based on the information about the avatar. For example, in the case where a password is requested, the avatar control unit 12 also creates the password. The avatar control unit 12 stores the account information including the account and the like of the vehicle avatar in a predetermined storage area in the external storage device 103, for example.

In OP104, the avatar control unit 12 notifies the driver of the vehicle 10 of registration of the account of the vehicle avatar, by a predetermined method. The method of notification to the driver of the vehicle 10 is notification by display on a display inside the vehicle 10, notification by transmission of an email to the user terminal 2 of the driver of the vehicle 10, or notification to the user terminal 2 of the driver of the vehicle 10 by a predetermined wireless communication method, for example. Then, the process illustrated in FIG. 5 is ended.

Figure 6:
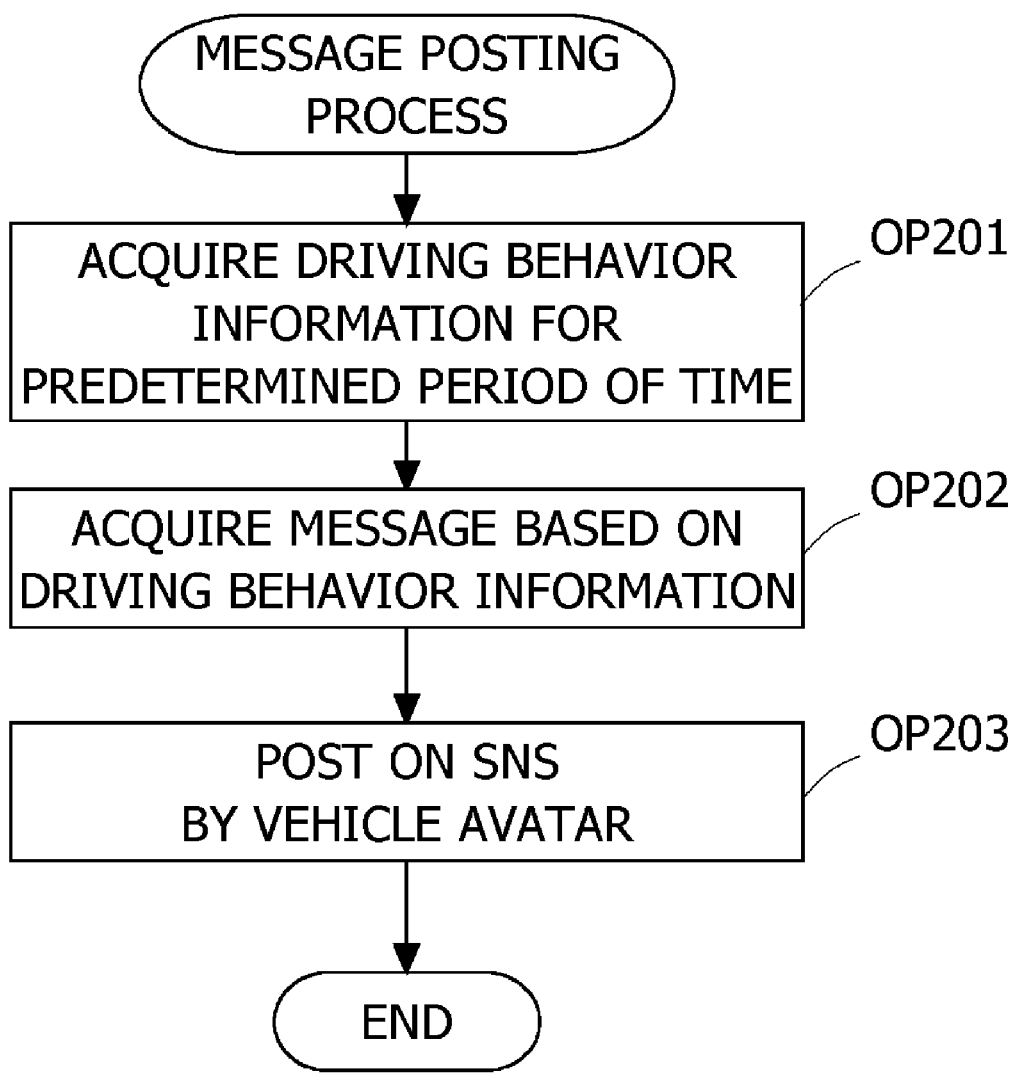
FIG. 6 is an example of a flowchart of a message posting process by the on-board device.

FIG. 6 is an example of a flowchart of a message posting process by the on-board device 1. The process illustrated in FIG. 6 is started at a timing as described above, for example.

In OP201, the avatar control unit 12 acquires the driving behavior information for a predetermined period of time from the driving behavior information DB 13. In OP202, the avatar control unit 12 inputs the acquired driving behavior information to the learned model, and acquires a message as the output. In OP203, the avatar control unit 12 accesses the SNS server 3, logs in to the SNS using the account of the vehicle avatar, and posts the created message. Then, the avatar control unit 12 logs out from the SNS, and the process illustrated in FIG. 6 is ended.

Figure 7:
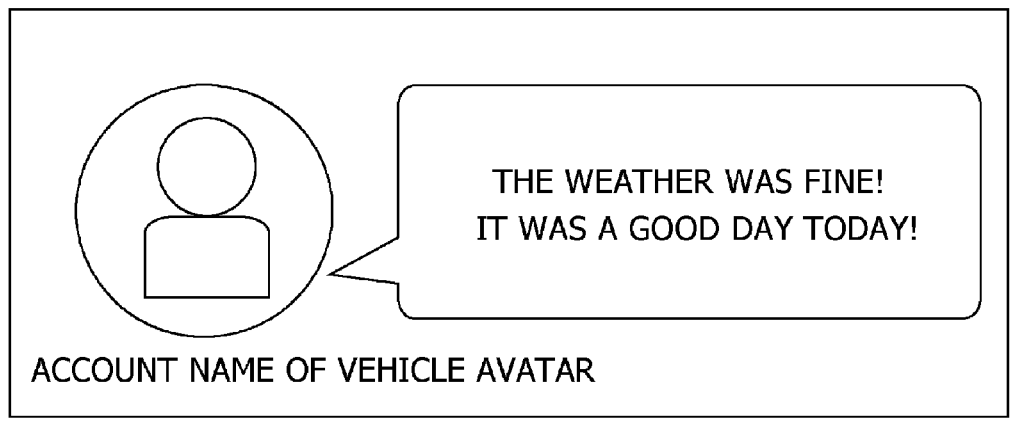
FIG. 7 is an example of output of the message of the vehicle avatar for a case where the driving behavior information indicates prudent driving.
Figure 8:
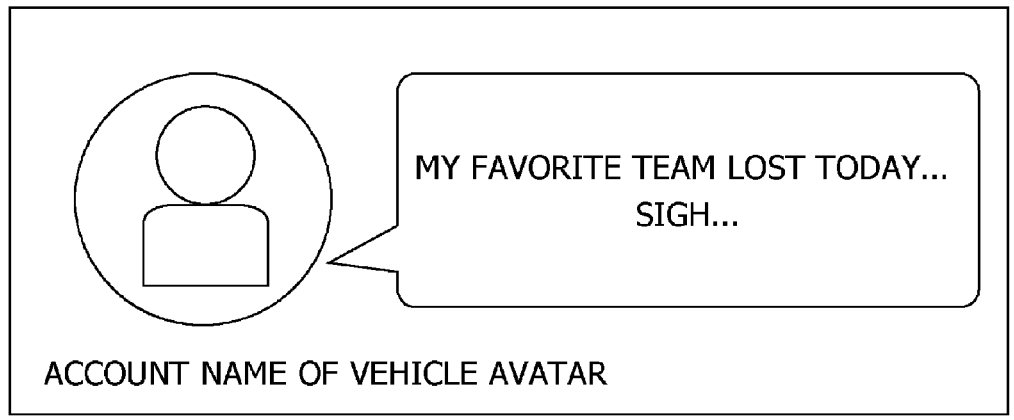
FIG. 8 is an example of output of the message of the vehicle avatar for a case where the driving behavior information indicates that driving is not prudent.

FIGS. 7 and 8 are examples of a display screen for post messages of the vehicle avatar in the SNS. For example, an aggregation result for the driving behavior information for a predetermined period of time is input to the learned model. The aggregation result for the driving behavior information for a predetermined period of time is the number of times of occurrence of predetermined event, for example, and is, more specifically, the number of times of occurrence of each of sudden braking, sudden starting, sudden steering, sounding of the horn, giving way to a pedestrian, merging support for another vehicle, and the like. For example, a greater number of times of sudden braking, sudden starting, sudden steering and sounding of the horn indicates less prudent driving, and a smaller number of times indicates more prudent driving. Furthermore, for example, a greater number of times of giving way to a pedestrian and of merging support for another vehicle indicates more prudent driving.

The driver of the vehicle 10 may check the post message of the vehicle avatar by accessing the page of the vehicle avatar on the SNS, for example.

FIG. 7 is an example of output of the message of the vehicle avatar for a case where the driving behavior information indicates prudent driving. In FIG. 7, content of the message of the avatar is "The weather was fine! It was a good day today!", and it is indicated that the vehicle avatar has a positive feeling. That is, the post of the vehicle avatar hints that driving was prudent according to the driving behavior information.

FIG. 8 is an example of output of the message of the vehicle avatar for a case where the driving behavior information indicates that driving is not prudent. In FIG. 8, content of the message of the vehicle avatar is "My favorite team lost today . . . sigh . . . ", and it is indicated that the vehicle avatar has a negative feeling. That is, the post of the vehicle avatar hints that driving was not prudent according to the driving behavior information.

On the SNS page of the vehicle avatar, the driver of the vehicle 10 and the vehicle avatar are not associated with each other on the SNS, and thus, the driver of the vehicle 10 is not identified from the SNS page of the vehicle avatar. Furthermore, the learned model is set such that the content of the message of the vehicle avatar is not related to the driving behavior information of the driver of the vehicle 10, and thus, even when a third party views the post message of the vehicle avatar, whether driving of the driver of the vehicle 10 is prudent or not will not be specified.

Operation and Effects of First Embodiment

In the first embodiment, the vehicle avatar corresponding to the vehicle 10 posts, on the SNS, a message according to the level of prudence of the driver in driving the vehicle 10. By viewing the post message of the vehicle avatar, the driver of the vehicle 10 may reflect back on the level of prudence in his/her driving. Furthermore, because the vehicle avatar is an avatar that is not related to the driver of the vehicle 10, the driver of the vehicle 10 may view the post message of the vehicle avatar from a more objective perspective. The driver of the vehicle 10 may thus be encouraged to drive safely.

Furthermore, the SNS is used by a large number of unspecified users, and the post message of the vehicle avatar is made public to a large number of unspecified users. The driver of the vehicle 10 thus becomes conscious of other people, and may be encouraged to drive more safely.

<First Variation>

In the first embodiment, the message of the vehicle avatar is created based on the driving behavior information. However, the message of the vehicle avatar is not limited to this, and may be created based also on information about a surrounding environment of a road where the vehicle 10 traveled, in addition to the driving behavior information.

For example, when there is a traffic jam, the driver of the vehicle 10 may be likely to become irritated, and prudence in driving may be lost. However, it can be assumed that prudence in driving is lost because the driver of the vehicle 10 is affected by the surrounding environment, not because of the true nature of the driver. Accordingly, the avatar control unit 12 creates the message of the vehicle avatar also taking into account the surrounding environment. Information about the surrounding environment will be hereinafter referred to as environment factor information.

In a first variation, traffic jam information is used as the information about the surrounding environment. In the first variation, the traffic jam information is acquired at the time of creation of the driving behavior information, from Vehicle Information and Communication System (VICS; registered trademark) through the car navigation system provided in the vehicle 10, and is stored in the driving behavior information DB 13, for example.

However, the information about the surrounding environment is not limited to the traffic jam information. Furthermore, the learned model is created and learned with the driving behavior information and the information about surroundings as input. For example, in the first variation, when the driving behavior information indicates that driving is not prudent, the message of the vehicle avatar is created in such a way that the positive feeling is greater or the negative feeling is smaller in a case where there is a traffic jam than in a case where there is no traffic jam. Furthermore, in the first variation, when the driving behavior information indicates that driving is prudent, the message of the vehicle avatar is created in such a way that the positive feeling is greater in a case where there is a traffic jam than in a case where there is no traffic jam.

Figure 9:
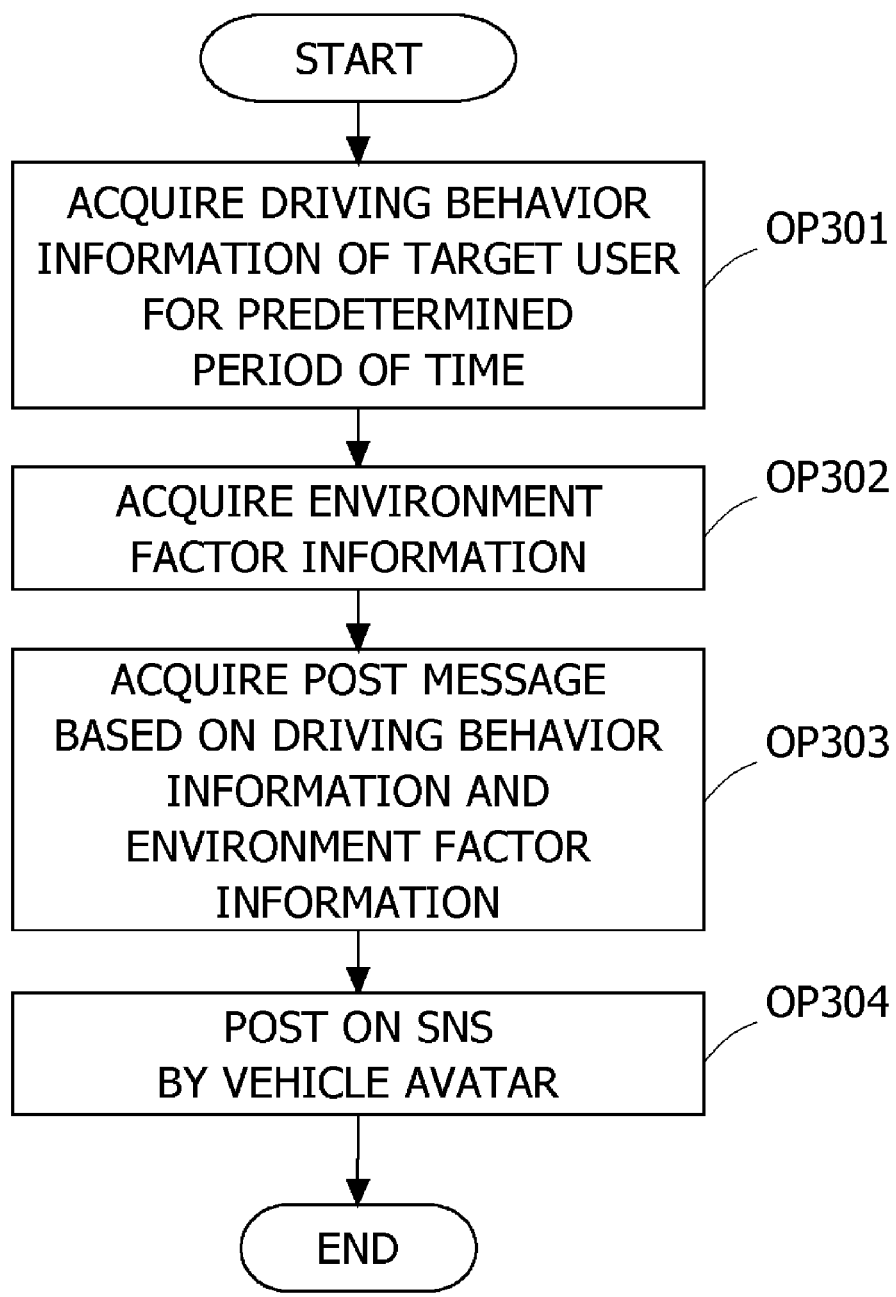
FIG. 9 is an example of a flowchart of a message posting process by the on-board device according to the first variation of the first embodiment.

FIG. 9 is an example of a flowchart of a message posting process by the on-board device 1 according to the first variation of the first embodiment. In OP301, the avatar control unit 12 acquires the driving behavior information for a predetermined period of time from the driving behavior information DB 13. In OP302, the avatar control unit 12 acquires the environment factor information for the predetermined period of time. However, the process in OP302 does not have to be performed in a case where the driving behavior information and the traffic jam information are stored in the driving behavior information DB 13. In the case where the traffic jam information is not stored in the driving behavior information DB 13, the avatar control unit 12 may acquire the traffic jam information by accessing a predetermined server.

In OP303, the avatar control unit 12 inputs the acquired driving behavior information and environment factor information to the learned model, and acquires a message as the output. In OP304, the avatar control unit 12 accesses the SNS server 3, logs in to the SNS using the account of the vehicle avatar, and posts the created message. Then, the avatar control unit 12 logs out from the SNS, and the process illustrated in FIG. 9 is ended.

In the first variation, even if the driving behavior information indicates that driving is not prudent, for example, if there is a traffic jam, a message indicating a positive feeling, as illustrated in FIG. 7, is possibly posted. Additionally, in the first embodiment, in the case where the driving behavior information indicates that driving is not prudent, a message indicating a negative feeling, as illustrated in FIG. 8, is posted regardless of whether or not there is a traffic jam. A negative effect on the driver from the surrounding environment may be prevented from being reflected in the post message of the vehicle avatar.

<Second Variation>

In a second variation, the message of the vehicle avatar is created based on the vehicle behavior information, and the display screen for the post message of the vehicle avatar is created based on the environment factor information. For example, the avatar control unit 12 of the on-board device 1 may use a learned model for message creation and a learned model for background creation. The learned model for message creation takes the vehicle behavior information as the input, and the message is given as the output. The learned model for background creation takes the environment factor information as the input, and the background of the display screen for the post message is given as the output. However, such a case is not restrictive, and the avatar control unit 12 may acquire the post message and the background using one learned model. In this case, the learned model takes the driving behavior information and the environment factor information as the input, and the post message and the background are given as the output.

Figure 10:
FIG. 10 is an example of a display screen for a post message according to the second variation.

FIG. 10 is an example of a display screen for a post message according to the second variation. In the second variation, in the case where the environment factor information indicates that the surrounding environment of the vehicle 10 negatively affects the driver of the vehicle 10, for example, the avatar control unit 12 creates, for the post message, a background that gives a dark impression. Furthermore, in the case where the environment factor information indicates that the surrounding environment of the vehicle 10 does not negatively affect the driver of the vehicle 10, for example, the avatar control unit 12 may create, for the post message, a background that gives a cheerful impression. Furthermore, the greater the level of negative effect from the surrounding environment of the vehicle 10 on the driver of the vehicle 10 according to the environment factor information, the darker the background of the post message may be made. The level of negative effect from the surrounding environment on the driver of the vehicle 10 may be determined based on a proportion of duration of a traffic jam in a travel period or the number of times of getting stuck in a traffic jam, for example.

In FIG. 10, the post message of the vehicle avatar indicates a positive feeling, but the background has a color that gives a dark impression. In this case, it is indicated that driving of the driver of the vehicle 10 was prudent in spite of the negative effect from the surrounding environment of the vehicle 10 on the driver of the vehicle 10.

For example, in the case where the message on the display screen for the post message of the vehicle avatar indicates a negative feeling, and the background of the display screen has a color that gives a dark impression, the driver of the vehicle 10 may grasp, from viewing the screen, that driving in the corresponding period was negatively affected by the surrounding environment. The driver of the vehicle 10 may thus try to drive prudently no matter what the surrounding environment is like, for example.

Other Embodiments

The embodiment described above is an example, and the present disclosure may be changed and carried out as appropriate without departing from the gist of the present disclosure.

In the first embodiment and the variations, creation and posting of the message of the vehicle avatar are performed by the on-board device 1, but such a case is not restrictive. For example, creation and posting of the message of the vehicle avatar may be performed by a predetermined server. In the case where a predetermined server is to create and post the message of the vehicle avatar, the on-board device 1 transmits the driving behavior information to the server at a predetermined timing, for example, and the server holds the driving behavior information for each user. The timing when the on-board device 1 transmits the driving behavior information to the server is one or more of every predetermined period of time, a timing when the driving behavior information is created, a timing when end of traveling is detected, or a predetermined time once per day, for example. The server creates the message of the vehicle avatar based on the driving behavior information that is received from the on-board device 1. The method of creating the message may be the same as that in the first embodiment and the variations. Regardless of whether the on-board device 1 is to create the vehicle avatar and register the same in the SNS or the server is to perform such creation and registration, if the server is to create and post the message of the vehicle avatar, the server is to hold information such as the account and the login password of the vehicle avatar. In the case where the server is to create and post the message of the vehicle avatar, the server is an example of "information processing device".

In the case where the server is to create and post the message of the vehicle avatar, the server may collect a greater variety and a greater number of information pieces as the environment factor information. For example, stress values, construction work information and the like for a region where the vehicle 10 traveled may be collected as the environment factor information, and be taken into account at the time of creation of the message of the vehicle avatar.

In the first embodiment and the variations, the message of the vehicle avatar is made public by being posted on the SNS. However, such a case is not restrictive, and the message of the vehicle avatar may be issued by being displayed on a display provided in the vehicle 10 or by being transmitted to the user terminal 2 of the driver of the vehicle 10 and by being displayed on a display, for example, instead of being posted on the SNS.

In the first embodiment and the variations, the learned model is prepared according to the information about the vehicle 10, but such a case is not restrictive. For example, the message of the vehicle avatar may be created using a common learned model, regardless of the information about the vehicle 10. The common learned model in this case takes information about the vehicle and the driving behavior information as the input, and a message in a tone or the like according to the information about the vehicle may be acquired as the output.

Furthermore, in the first embodiment and the variations, the learned model is used to create the message of the vehicle avatar, but such a case is not restrictive. For example, the message of the vehicle avatar may be created by changing, according to information about a respective vehicle, an expression, a tone or the like of a message that is set in advance according to a value obtained by quantifying the driving behavior information.

Furthermore, in the case where there is a plurality of drivers of the vehicle 10, the on-board device 1 may create the vehicle avatar for each driver. In this case, the vehicle 10 may store identification information of the driver and identification information of the vehicle avatar in association with each other, and may request the driver to input the identification information every time traveling by the vehicle 10 is performed to switch between target vehicle avatars. Furthermore, basic setting of the vehicle avatar (appearance, personality, sex, age and the like) may be changed for each driver. Different vehicle avatars have different accounts on the SNS. Moreover, the on-board device 1 may store the identification information of the driver, the identification information of the vehicle avatar, and the account information of the vehicle avatar in association with one another.

Furthermore, in the first embodiment and the variations, the on-board device 1 creates the message of the vehicle avatar and posts the message on the SNS, but such a case is not restrictive, and an image, audio data or a moving image may be posted by the vehicle avatar. Furthermore, a combination of the message and an image, audio data or a moving image may be posted by the vehicle avatar. Moreover, the message of the vehicle avatar may be created using other parameters such as news information.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing device comprising a processor configured to:
    acquire driving behavior information as an indication of prudence of a driver in driving a vehicle from one or more sensors provided with the vehicle,
    acquire a vehicle avatar corresponding to the vehicle, the vehicle avatar having a basic personality set thereto according to information about the vehicle,
    store account information of the vehicle avatar for a predetermined social network service (SNS),
    acquire a message by the vehicle avatar output from a machine learning model associated with the vehicle avatar by inputting the driving behavior information to the machine learning model, wherein the machine learning model learns the driving behavior information and messages by the vehicle avatar as teacher data and wherein the message output from the machine learning model is not related to the information about the vehicle and the driving behavior information, but reflects the prudence of the driver in driving the vehicle, and post the message on the predetermined SNS using the account information of the vehicle avatar at a predetermined time once per day or a timing of end of traveling, wherein the message is displayed as text uttered by the vehicle avatar and the displayed text is updated based on the prudence of the driver.

2. The information processing device according to claim 1, wherein, in a case where the driving behavior information indicates that driving of the driver is prudent, the processor is configured to create a message indicating that the vehicle avatar has a positive feeling.

3. The information processing device according to claim 1, wherein, in a case where the driving behavior information indicates that driving of the driver lacks prudence, the processor is configured to create a message indicating that the vehicle avatar has a negative feeling.

4. The information processing device according to claim 1, wherein
the processor is configured to:
acquire information about an environment of surroundings on a road where the vehicle traveled; and
create the message based on the driving behavior information and the information about the environment.

5. The information processing device according to claim 4, wherein, in a case where the driving behavior information indicates that driving of the driver lacks prudence and the information about the environment indicates that a surrounding environment negatively affects a feeling of the driver, the processor is configured to create a message indicating that the vehicle avatar has a more positive feeling than in a case where the driving behavior information indicates that driving of the driver lacks prudence and the information about the environment indicates that the surrounding environment does not negatively affect the feeling of the driver.

6. The information processing device according to claim 1, wherein
the processor is configured to:
acquire information about an environment of surroundings on a road where the vehicle traveled;
create a background of a display screen for the message based on the information about the environment; and
output information about the background of the display screen together with the message.

7. The information processing device according to claim 1, wherein the driving behavior information includes at least one of a number of times of sudden braking, a number of times of sudden steering, a number of times of sudden starting, and a number of times a horn is sounded.

8. A non-transitory computer-readable recording medium recorded with a program for causing a computer to:
acquire driving behavior information as an indication of prudence of a driver in driving a vehicle from one or more sensors provided with the vehicle,
acquire a vehicle avatar corresponding to the vehicle, the vehicle avatar having a basic personality set thereto according to information about the vehicle,
store account information of the vehicle avatar for a predetermined social network service (SNS),
acquire a message by the vehicle avatar output from a machine learning model associated with the vehicle avatar by inputting the driving behavior information to the machine learning model, wherein the machine learning model learns the driving behavior information and messages by the vehicle avatar as teacher data and wherein the message output from the machine learning model is not related to the information about the vehicle and the driving behavior information, but reflects the prudence of the driver in driving the vehicle, and post the message on the predetermined SNS using the account information of the vehicle avatar at a predetermined time once per day or a timing of end of traveling, wherein the message is displayed as text uttered by the vehicle avatar and the displayed text is updated based on the prudence of the driver.

9. The non-transitory computer-readable recording medium according to claim 8, wherein, in a case where the driving behavior information indicates that driving of the driver is prudent, the program causes the computer to create a message indicating that the vehicle avatar has a positive feeling.

10. The non-transitory computer-readable recording medium according to claim 8, wherein, in a case where the driving behavior information indicates that driving of the driver lacks prudence, the program causes the computer to create a message indicating that the vehicle avatar has a negative feeling.

11. The non-transitory computer-readable recording medium according to claim 8, wherein
the program causes the computer to:
acquire information about an environment of surroundings on a road where the vehicle traveled; and
create the message based on the driving behavior information and the information about the environment.

12. The non-transitory computer-readable recording medium according to claim 11, wherein, in a case where the driving behavior information indicates that driving of the driver lacks prudence and the information about the environment indicates that a surrounding environment negatively affects a feeling of the driver, the program causes the computer to create a message indicating that the vehicle avatar has a more positive feeling than in a case where the driving behavior information indicates that driving of the driver lacks prudence and the information about the environment indicates that the surrounding environment does not negatively affect the feeling of the driver.

13. The non-transitory computer-readable recording medium according to claim 8, wherein
the program causes the computer to:
acquire information about an environment of surroundings on a road where the vehicle traveled; create a background of a display screen for the message based on the information about the environment; and
output information about the background of the display screen together with the message.

14. An information processing method executed by a computer comprising:
acquiring, from one or more sensors provided in a vehicle, driving behavior information as an indication of prudence of a driver in driving the vehicle,
acquiring a vehicle avatar corresponding to the vehicle, the vehicle avatar having a basic personality set thereto according to information about the vehicle,
storing account information of the vehicle avatar for a predetermined social network service (SNS),
acquiring a message by the vehicle avatar output from a machine learning model associated with the vehicle avatar by inputting the driving behavior information to the machine learning model, wherein the machine learning model learns the driving behavior information and messages by the vehicle avatar as teacher data and wherein the message output from the machine learning model is not related to the information about the vehicle and the driving behavior information, but reflects the prudence of the driver in driving the vehicle, and posting the message on the predetermined SNS using the account information of the vehicle avatar at a predetermined time once per day or at an end time of traveling, wherein the message is displayed as text uttered by the vehicle avatar and the displayed text is updated based on the prudence of the driver.

* * * * *